United States Patent Office 3,437,621
Patented Apr. 8, 1969

3,437,621
RUBBER RELEASE AGENTS COMPRISING FATTY ACID SALTS, POLYETHYLENE GLYCOL ETHER AND HYDROCARBON
Erwin Aron, Paterson, N.J., assignor to Technical Processing, Inc., Paterson, N.J., a corporation of New Jersey
No Drawing. Filed Oct. 30, 1964, Ser. No. 407,901
Int. Cl. C08c 11/72, 11/32, 11/34
U.S. Cl. 260—23.7
6 Claims

ABSTRACT OF THE DISCLOSURE

A composition which comprises an oleate salt of a metal, a potassium salt of a fatty acid, a fatty acid, a polyethylene glycol ester or ether, an alkylglycol, or a derivative thereof, a high molecular weight alkylol, and a paraffin. This composition is useful as a mill release agent in rubber bases.

---

This invention relates to novel compositions which aid in the processing of rubber goods.

During the milling of rubber goods it is generally the practice to incorporate detackifiers, such as low molecular weight polyethylenes and soaps, in the rubber compositions to help effect mill release of the rubber goods. These detackifiers must be added in relatively large quantities in order to satisfactorily perform the desired function. In such amounts these detackifiers excessively change the physical properties of the rubber compositions and in many instances interfere with the adhesive properties of the rubber compositions.

The novel compositions of the present invention aid in the mill release of rubber compositions without changing the physiacl properties of such compositions and without interfering with the adhesive properties of such rubber compositions in subsequent processing operations. Moreover, these novel compositions even aid in the knitting of rubber laminates during the curing operation. The compositions of the present invention also improve the surface appearance of molded or extruded rubber articles, improve the dispersion of fillers in the rubber composition and provide lower Mooney viscosity without change in the hardness of the rubber compositions.

Therefore, according to the present invention there are provided cohesive homogeneous compositions comprising about 10% to about 14% of an oleate salt of bi-valent metals selected from the group consisting of zinc, magnesium, calcium, strontium and barium, about 5% to about 8% of a potash soap made substantially with saturated fatty acids having about 12 to about 18 carbon atoms in the chains, about 14% to bout 17% of substantially saturated fatty acids having about 12 to about 18 carbon atoms in the chains, about 4% to about 20% of a compound selected from the group consisting of polyethyleneglycol alkyl ethers, polyethyleneglycol alkylphenol ethers and polyethyleneglycol monoesters of fatty acids, the polyethyleneglycol portion of said compound having a molecular weight of between about 100 and about 400 and the alkyl portion of said compound containing from about 12 to about 20 carbon atoms, about 5% to about 10% of alkylglycols having both water and oil solubility and having from 1 to 4 methyl groups or methylene groups not directly connected to the hydroxyl groups and polyglycols of said compounds, about 3% to about 5% of alkylols selected from the group consisting of branched and straight chain compounds and having from about 11 to about 18 carbon atoms in the chain and about 40% to about 50% of paraffins selected from the group consisting of petrolatum, mineral oils and paraffin waxes.

A preferred composition of the present invention comprises about 10% to about 14% of zinc oleate, about 5% to about 8% of a potash soap made substantially with saturated fatty acids having a chain length of about 16 to about 18 carbon toms, about 14% to about 17% of saturated fatty acids having a chain length of about 16 to about 18 carbon atoms, about 4% to about 20% of tetraethyleneglycol nonylphenolether, about 5% to about 10% of tripropyleneglycol, about 3% to about 5% of a straight chain alkylol having about 16 to about 18 carbon atoms in the chain and about 40% to about 50% petrolatum. The percentages specified in the compositions above and throughout this specification are on a total weight basis.

The cohesive homogeneous compositions of this invention are made by heating the above ingredients together until a clear melt is obtained. The metal oleate and potash soaps employed in the compositions of this invention may be formed in situ during the course of the heating as is well known in the art. A general procedure for the preparation of the compounds of this invention is as follows:

An oxide, hydroxide or carbonate of a bi-valent metal is reacted with oleic acid in approximately stoichiometric proportions or in slight excess of about 0.25 to about 2% oleic acid to produce the corresponding oleate salt. The temperature for this reaction ranges from about 90° to about 130° C. and preferably about 95 to 105° C. This temperature range also applies to the other steps in preparing this mixture. The metal and oleic acid are heated together until a clear melt is obtained and all of the water of the reaction is boiled off. After the oleate salt is formed, the alkylol, paraffin compound and the fatty acid are added to the reaction mass and the total mixture agitated. An oxide, hydroxide or carbonate of potassium is then added and the mixture agitated until a clear mass is formed. The polyethyleneglycol, compound and the alkyl polyglycol compound are then added to the reaction mass and heat applied until a clear melt is obtained.

The above procedure may be illustrated by reference to the following preferred procedure for making the compounds of this invention:

10.5 g. oleic acid and 1.3 g. zinc oxide are heated together to about 100° C. until a clear melt is obtained and essentially all the water of the reaction is boiled off. Then 3.9 g. cetyl alcohol techn., 42.8 petrolatum U.S.P and 18.5 g. hydrogenated tallow fatty acids are added. The temperature is brought to about 90° to 95° C. and 1.7 g. potassium hydroxide 45% added with mixing. The temperature is then brought to about 100° C and mixing is continued until the mass is clear. Then 15.4 g. tetraethyleneglycol nonyl phenolether and 7.7 g. tripropyleneglycol are mixed in. Heat is only applied at this stage to obtain a clear melt. The compound is then ready for filling into suitable containers.

The compositions of the present invention are incorporated into the rubber during the compounding stage. In ordinary compounding, raw rubber is first masticated to make it more pliable and then it is admixed with other compounding ingredients, such as pigments, i.e., carbon black, fillers, e.g. the oxides of zinc, magnesium, lead or calcium, vulcanizing agents, e.g., sulfur, etc. The compositions of the present invention can be admixed together with these additives to effect uniform distribution. In general about 0.25% to about 0.75% of the compositions of this invention, based on the total weight of the rubber item, is employed.

The compositions of this invention may be added to any type rubber whether it be natural, synthetic or of the reclaimed type.

The following formulations prepared according to the above procedure illustrate the novel compositions of the present invention:

Composition A

| | G. |
|---|---|
| Zinc oleate | 11.0 |
| Potassium soap from hydrogenated tallow fatty acids | 5.2 |
| Hydrogenated tallow fatty acids | 14.0 |
| Tetraethyleneglycol nonylphenolether | 15.4 |
| Tripropyleneglycol | 7.7 |
| Cetyl alcohol, techn. grade | 3.9 |
| Petrolatum U.S.P. | 42.8 |

Composition B

| Magnesium oleate | 10.7 |
|---|---|
| Potassium stearate | 5.5 |
| Stearic acid, techn. grade | 14.0 |
| Hexaethyleneglycoldodecylphenolether | 15.4 |
| Tripropyleneglycol | 7.7 |
| Cetyl alcohol, techn. grade | 3.9 |
| Petrolatum U.S.P. | 42.8 |

Composition C

| Calcium oleate | 12.0 |
|---|---|
| Potassium stearate | 5.2 |
| Stearic acid, techn. grade | 14.0 |
| Hexaethyleneglycoldodecylphenolether | 17.7 |
| Propylene glycol | 5.4 |
| 5-ethyl-2-nonanol | 3.0 |
| Paraffin wax, refined | 42.7 |

Composition D

| Barium oleate | 13.3 |
|---|---|
| Potassium stearate | 7.7 |
| Stearic acid, techn. grade | 17.0 |
| Polyglycol-400 monolaurate | 12.0 |
| Tripropyleneglycol | 8.0 |
| Cetyl alcohol, techn. grade | 4.0 |
| Mineral oil 100/100 | 5.0 |
| Petrolatum U.S.P. | 33.0 |

Composition E

| Zinc oleate | 14.0 |
|---|---|
| Potassium stearate | 8.0 |
| Stearic acid, techn. grade | 17.0 |
| Tetraethyleneglycolnonylphenolether | 4.3 |
| 2,4-dihydroxy-2-methylpentane | 8.6 |
| Cetyl alcohol, techn. grade | 4.4 |
| Petrolatum U.S.P. | 43.7 |

Each of the above compositions of the present invention was included in a rubber composition and evaluated for its effectiveness in releasing the rubber composition during the milling step. The results of these tests are set forth in Examples I–V below. The basic rubber composition used in each of these examples was as follows:

BASIC HARD PACKING FORMULA

| | Parts |
|---|---|
| 38% Acrylonitrile rubber | 100.00 |
| Durez resin 12687 (thermosetting phenolic resin) | 20.00 |
| Zinc oxide | 5.00 |
| Stearic acid | 1.50 |
| Medium thermal carbon black | 170.00 |
| Silicate filler, particle size 0.025 micron | 30.00 |
| Dibutylphthalate | 12.50 |
| Coumarone-Indene resin | 15.00 |
| Diethylene glycol | 1.00 |
| Sulfur | 1.50 |
| Benzothiazyldisulfide | 1.75 |

Example I

| | Parts |
|---|---|
| Basic hard packing formula (above) | 358.25 |
| Composition A | 1.00 |

Example II

| | Parts |
|---|---|
| Basic hard packing formula (above) | 358.25 |
| Composition B | 1.00 |

Example III

| Basic hard packing formula (above) | 358.25 |
|---|---|
| Composition C | 1.00 |

Example IV

| Basic hard packing formula (above) | 358.25 |
|---|---|
| Composition D | 1.00 |

Example V

| Basic hard packing formula (above) | 358.25 |
|---|---|
| Composition E | 1.00 |

The compositions of Examples I–V all gave good mill release. When the basic hard packing formula was employed by itself, the mill release was unsatisfactory.

Each of Compositions A through E was tested for its knitting properties by curing each of the compositions of Examples I through V to themselves at 320° F. for ten minutes by placing two strips of each composition surface to surface in one mold. The compositions of Examples I and II showed perfect knitting and no delamination occurred before break of the compositions themselves. The composition of Example I broke at an average of 72 lbs. and that of Example II broke at an average of 73 lbs. The compositions of Example III showed nearly perfect knitting. The force necessary to effect a separation of this composition was almost that necessary to break the composition. The composition started to delaminate at an average of 63 lbs. and broke at an average of 72 lbs. The compositions of Examples IV and V did not give perfect knitting but still a considerable force, about 75% of that necessary for breaking the compositions, had to be applied to separate the strips. Both of these compositions started to delaminate at an average of about 56 lbs. and both compositions separated before they broke.

The following examples illustrate the use of the compositions of this invention in a variety of rubber compositions:

Example VI

| | Parts |
|---|---|
| Smoked sheets (natural rubber) | 50.0 |
| Whole tire reclaim (natural and SBR reclaimed rubber) | 94.0 |
| Aromatic oil | 5.0 |
| Stearic acid | 1.0 |
| Zinc oxide | 3.0 |
| Phenyl-α-naphthlamine | 1.0 |
| Sulfur | 2.5 |
| 2,2'-benzothiarzyldisulfide | 1.0 |
| Zincdimethyldithiocarbamate | 0.1 |
| FT carbon black | 100.0 |
| MPC carbon black | 40.0 |
| Composition A | 1.5 |

The mill release of the rubber composition containing Composition A was good whereas the mill release of the rubber composition without Composition A was poor.

The rubber composition containing Composition A had a Mooney plasticity/1+4'/212° F. of 102.0 and a Mooney plasticity without Composition A of 117.0.

The rubber composition containing Composition A was cured for twenty minutes at 290° F. and had a Shore hardness of 86 and had the same hardness when cured at the same time and temperature without Composition A.

Example VII

| | Parts |
|---|---|
| Butyl rubber | 100.0 |
| Stearic acid | 1.0 |
| Zinc oxide | 5.0 |
| Phenyl-α-naphthylamine | 1.0 |
| Paraffin wax | 1.0 |
| Sulfur | 2.0 |
| 2-mercaptobenzothiazole | 0.5 |
| Tetramethylthiuramdisulfide | 1.0 |
| Telluriumdiethyldithiocarbamate | 1.0 |
| Aromatic oil | 5.0 |
| MPC carbon black | 10.0 |
| FEF carbon black | 70.0 |
| Composition B | 1.0 |

The mill release of the rubber composition of Example VII containing Composition B was good while the mill release of the same rubber composition without Composition B was poor.

The above rubber composition containing Composition B had a Mooney plasticity/1+4'/212° F. of 74.0 and a Mooney plasticity of 76.0 without Composition B.

The composition of Example VII had a Shore hardness after a fifteen minute cure at 320° F. of 77 and had the same hardness when cured at the same time and temperature without Composition B.

Having thus provided a written decription of the present invention and provided specific examples thereof, it should be understood that no undue restrictions or limitations are to be imposed by reason thereof but that the present invention is defined by the appended claims.

I claim:

1. A composition comprising about 10% to 14% of an oleate salt of a bi-valent metal selected from the group consisting of zinc, magnesium, calcium, strontium, and barium, about 5% to 8% of a potash soap made substantially with saturated fatty acids having about 12 to about 18 carbon atoms in the chain, about 14% to about 17% of substantially saturated fatty acids having about 12 to about 18 carbon atoms in the chain, about 4% to about 20% of a compound selected from the group consisting of polyethylene glycol alkyl ethers and polyethylene glycol alkylphenol ethers the polyethylene glycol portion of said compound having a molecular weight of between about 100 and 400 and the alkyl portion of said compound containing from about 12 to about 20 carbon atoms, about 5% to about 10% of alkylene glycols having both water and oil solubility and having from 1 to 4 groups selected from the group consisting of methyl and methylene radicals not directly connected to the hydroxyl groups and polyglycols of said compounds, about 3% to about 5% of alkanols selected from the group consisting of branched and straight chain compounds and having from about 11 to about 18 carbon atoms in the chain, and about 40% to about 59% of paraffins selected from the group consisting of petrolatum, minerals oils and paraffin waxes.

2. A composition comprising about 10 to about 14% of zinc oleate, about 5% to about 8% of a potash soap made substantially with saturated fatty acids having a chain length of about 16 to about 18 carbon atoms, about 14% to about 17% of saturated fatty acids having a chain length of about 16 to about 18 carbon atoms, about 4% to about 20% of tetraethyleneglycol monylphenol ether, about 5% to about 10% of tripropyleneglycol, about 3% to about 5% of a straight chain alkanol having about 16 to about 18 carbon atoms in the chain and about 40% to about 50% of petrolatum.

3. A rubber composition comprising a rubber base, carbon black, fillers and a relatively small amount of a homogeneous cohesive composition comprising about 10% to 14% of an oleate salt of a bi-valent metal selected from the group consisting of zinc, magnesium, calcium, strontium and barium, about 5% to 8% of a potash soap made substantially with saturated fatty acids having about 12 to about 18 carbon atoms in the chain, about 14% to about 17% of substantially saturated fatty acids having about 12 to about 18 carbon atoms in the chain, about 4% to about 20% of a compound selected from the group consisting of polyethylene glycol alkyl ethers and polyethylene glycol alkylphenol ethers, the polyethylene glycol portion of said compound having a molecular weight of between about 100 to about 400 and the alkyl portion of said compound containing from about 12 to about 20 carbon atoms, about 5% to about 10% of alkylene glycols having both water and oil solubility and having from 1 to 4 groups selected from the group consisting of methyl and methylene radicals not directly connected to the hydroxyl groups and polyglycols of said compounds, about 3% to about 5% of alkanols selected from the group consisting of branched and straight chain compounds and having from about 11 to about 18 carbon atoms in the chain, and about 40% to about 50% of paraffins selected from the group consisting of petrolatum, mineral oils and paraffin waxes.

4. A rubber composition comprising a rubber base, a phenolic resin, carbon black, fillers and a relatively small amount of a homogeneous cohesive composition comprising about 10 to about 14% of zinc oleate, about 5% to about 8% of a potash soap made substantially with saturated fatty acids having a chain length of about 16 to about 18 carbon atoms, about 14% to about 17% of saturated fatty acids having a chain length of about 16 to about 18 carbon atoms, about 4% to about 20% of tetraethyleneglycol monylphenolether, about 5% to about 10% of tripropyleneglycol, about 3% to about 5% of a straight chain alkanol having about 16 to about 18 carbon atoms in the chain and about 40% to about 50% of petrolatum.

5. The rubber composition of claim 3 wherein said relatively small amout is about 0.25% to about 0.75% by weight.

6. The rubber composition of claim 4 wherein said relatively small amount is about 0.25% to about 0.75% by weight.

References Cited

UNITED STATES PATENTS

| 2,500,858 | 3/1950 | Pape et al. | 260—752 |
| 2,059,448 | 11/1936 | Epstein et al. | 260—761 |
| 2,939,898 | 6/1960 | Aron | 260—752 |
| 2,975,130 | 3/1961 | Potter | 252—28 |
| 3,201,361 | 8/1965 | Aron | 260—23.7 |

OTHER REFERENCES

"Compounding Ingredients for Rubber," 1961, pages 181, 209, 394, TS 1890 I 53.

Curme et al., "Glycols," 1952, page 280, Copy in S.L., QD 305 A4C88.

"Merck Index," 1960, page 788, Copy in Gr 140. RS 356 M 524.

DONALD E. CZAJA, Primary Examiner.

R. A. WHITE, Assistant Examiner.

U.S. Cl. X.R.

260—752, 33.4, 754, 33.6, 757, 759, 761, 41.5, 33.2; 252—40, 52